United States Patent
Liu

(10) Patent No.: US 11,929,922 B2
(45) Date of Patent: Mar. 12, 2024

(54) ROUTING INFORMATION PROCESSING METHOD AND APPARATUS

(71) Applicant: HUAWEI TECHNOLOGIES CO., LTD., Shenzhen (CN)

(72) Inventor: Guoliang Liu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 37 days.

(21) Appl. No.: 17/851,380

(22) Filed: Jun. 28, 2022

(65) Prior Publication Data

US 2022/0329517 A1 Oct. 13, 2022

Related U.S. Application Data

(63) Continuation of application No. PCT/CN2020/119117, filed on Sep. 29, 2020.

(30) Foreign Application Priority Data

Dec. 31, 2019 (CN) .......................... 201911403426.0

(51) Int. Cl.
*G06F 15/16* (2006.01)
*H04L 45/42* (2022.01)
(Continued)

(52) U.S. Cl.
CPC .............. *H04L 45/42* (2013.01); *H04L 45/24* (2013.01); *H04L 45/566* (2013.01); *H04L 45/745* (2013.01)

(58) Field of Classification Search
CPC ....... H04L 45/42; H04L 45/24; H04L 45/745; H04L 45/34
See application file for complete search history.

(56) References Cited

U.S. PATENT DOCUMENTS 8,599,239 B2 * 12/2013 White ...................... H04N 7/15
 348/14.08
8,953,590 B1 * 2/2015 Aggarwal ........... H04L 12/4675
 370/409

(Continued)

FOREIGN PATENT DOCUMENTS

| CN | 108696416 A | 10/2018 |
| CN | 109873760 A | 6/2019 |
| WO | 2020182156 A1 | 9/2020 |

OTHER PUBLICATIONS

Sajassi et al., "BGP MPLS-Based Ethernet VPN", RFC7432, Internet Engineering Task Force (IETF), Feb. 2015, 56 pages.

*Primary Examiner* — Hieu T Hoang
(74) *Attorney, Agent, or Firm* — Maier & Maier, PLLC

(57) ABSTRACT

Embodiments relate to a routing information processing method and apparatus. The method implemented by a first network device includes: obtaining a local route corresponding to a second network device, where the local route includes a first identifier; allocating a first segment identifier based on the fact that the first identifier exists only in the local route; obtaining a local route and a remote route that correspond to a third network device, where each of the local route and the remote route includes a second identifier; allocating a second segment identifier based on the fact that the second identifier exists at least in the local route and the remote route; and sending routing information including the first segment identifier and the second segment identifier. This avoids traffic interruption of a failure-free single-homed network device in a scenario in which single-homing and multi-homing coexist.

20 Claims, 6 Drawing Sheets

(51) Int. Cl.
*H04L 45/24* (2022.01)
*H04L 45/00* (2022.01)
*H04L 45/745* (2022.01)

(56) References Cited

U.S. PATENT DOCUMENTS

| | | | |
|---|---|---|---|
| 10,383,027 B1* | 8/2019 | Sivaraj | H04L 45/28 |
| 2011/0286452 A1* | 11/2011 | Balus | H04L 45/04 |
| | | | 370/390 |
| 2012/0213222 A1* | 8/2012 | Filsfils | H04L 12/4641 |
| | | | 370/392 |
| 2019/0052559 A1* | 2/2019 | Velayudhan | H04L 45/28 |
| 2020/0007422 A1* | 1/2020 | Ramanarayanan | H04L 41/06 |
| 2020/0136958 A1* | 4/2020 | Kouvelas | H04L 12/4641 |
| 2021/0099400 A1* | 4/2021 | Elizabeth | H04L 45/66 |
| 2021/0119911 A1* | 4/2021 | Zhao | H04L 45/04 |

* cited by examiner

ROUTING INFORMATION PROCESSING METHOD AND APPARATUS

CROSS-REFERENCE TO RELATED APPLICATIONS

This application is a continuation of International Application No. PCT/CN2020/119117, filed on Sep. 29, 2020, which claims priority to Chinese Patent Application No. 201911403426.0, filed on Dec. 31, 2019. The disclosures of the aforementioned applications are hereby incorporated by reference in their entireties.

TECHNICAL FIELD

The embodiments relate to the field of communication technologies, and a routing information processing method, and an apparatus.

BACKGROUND

In an Internet protocol (IP) network traffic forwarding scenario, a network device A is dual-homed to a network device B and a network device C, and a network device D is single-homed to the network device B. The network device B configures a virtual private network segment identifier (vpnsid) and advertises routing information that carries the vpnsid. The network device C allocates a mirror segment identifier mirror-sid, and advertises a mirror message, to declare protection of a location identifier of the network device B. A provider backbone (P) node directly connected to the network device B establishes a protection relationship between the location identifier of the network device B and the mirror-sid configured by the network device C.

In a scenario in which single-homing and multi-homing coexist and a failure occurs, if sensing that the failure occurs, the P node performs mirror protection, to encapsulate the mirror-sid into a received packet based on the protection relationship between the location identifier of the network device B and the mirror-sid configured by the network device C, and send the packet to the network device C. The network device C receives the packet and queries a routing outbound interface based on the mirror-sid encapsulated in the packet. If the packet is to be sent to the network device A, the network device C finds that the routing outbound interface points to the network device A, and sends the packet to the network device A. If the packet is to be sent to the network device D, the network device C finds that the routing outbound interface is null, and directly discards the packet. However, if a link between the P node and the network device B fails, but the network device B does not fail, a packet that can originally reach the network device D through the network device B is discarded. This causes traffic interruption of a failure-free single-homed network device in the scenario in which single-homing and multi-homing coexist.

SUMMARY

The embodiments may provide a routing information processing method and apparatus, to resolve a problem of traffic interruption of a failure-free single-homed network device in a conventional technology in a scenario in which single-homing and multi-homing coexist.

According to a first aspect, the embodiments may provide a routing information processing method, including: The first network device obtains a local route corresponding to a second network device, where the local route includes a first identifier, the first identifier includes a first Ethernet segment identifier (ESI) or a first destination Internet protocol (IP) address, the first ESI identifies the second network device, and the first destination IP address points to the second network device. The first network device allocates, based on the fact that the first identifier exists only in the local route, a first segment identifier corresponding to the second network device. The first network device obtains a local route and a remote route that correspond to a third network device, where each of the local route and the remote route includes a second identifier, the second identifier includes a second ESI or a second destination IP address, the second ESI identifies the third network device, and the second destination IP address points to the third network device. The first network device allocates, based on the fact that the second identifier exists at least in the local route and the remote route, a second segment identifier corresponding to the third network device. The first network device sends routing information, where the routing information includes the first segment identifier and the second segment identifier. A fourth network device receives the routing information and advertises mirror routing information for the first network device, where the mirror routing information includes the second segment identifier but does not include the first segment identifier; or the mirror routing information includes a second location identifier corresponding to the second segment identifier but does not include a first location identifier corresponding to the first segment identifier.

In the method, the fourth network device sets up mirror protection for the second segment identifier or the second location identifier of the third network device as a multi-homed network device and sets up no mirror protection for the first segment identifier or the first location identifier of the second network device as a single-homed network device. In this way, in a scenario in which single-homing and multi-homing coexist, if the first network device does not fail, whether a link to the second network device fails may be checked for a packet to be sent to the second network device. When the link does not fail, the packet may be successfully sent to the second network device through the first network device. This ensures that traffic of the failure-free single-homed network device is not interrupted in the scenario in which single-homing and multi-homing coexist.

In a possible implementation, that the first network device allocates, based on the fact that the first identifier exists only in the local route, a first segment identifier corresponding to the second network device includes: If ESI deployment is supported, the first network device allocates, based on the fact that the first ESI exists only in the local route, the first segment identifier corresponding to the second network device, where the first identifier is the first ESI. Alternatively, if ESI deployment is not supported, the first network device allocates, based on the fact that the first destination IP address exists only in the local route, the first segment identifier corresponding to the second network device, where the first identifier is the first destination IP address.

In this implementation, the first network device may identify different types of first identifiers depending on whether the ESI deployment is supported and determine that the first identifier exists only in the local route, to allocate the corresponding first segment identifier to the single-homed second network device.

In a first possible implementation, that the first network device allocates, based on the fact that the second identifier exists at least in the local route and the remote route, a second segment identifier corresponding to the third network device includes: If the ESI deployment is supported, the first network device allocates, based on the fact that the second ESI exists at least in the local route and the remote route, the second segment identifier corresponding to the third network device, where the second identifier is the second ESI. Alternatively, if the ESI deployment is not supported, the first network device allocates, based on the fact that the second destination IP address exists at least in the local route and the remote route, the second segment identifier corresponding to the third network device, where the second identifier is the second destination IP address.

In this implementation, the first network device may identify different types of second identifiers depending on whether the ESI deployment is supported and determine that the second identifier exists at least in the local route and the remote route, to allocate the corresponding second segment identifier to the multi-homed third network device.

In a possible implementation, the remote route is received by the first network device from the fourth network device, and that the first network device sends routing information includes: The first network device sends the routing information to the fourth network device.

In a possible implementation, the first segment identifier corresponds to the first location identifier, the second segment identifier corresponds to the second location identifier, the first location identifier and the second location identifier belong to a same location identifier group, and the first location identifier is different from the second location identifier.

In this implementation, the first network device may dynamically allocate, based on a single-homed/multi-homed state of each of the second network device and the third network device, segment identifiers for location identifiers corresponding to the single-homed network device and the multi-homed network device, to perform effective protection when single-homing and multi-homing coexist, and facilitate network management.

In a possible implementation, the first location identifier and the second location identifier have different prefix lengths; or the first location identifier and the second location identifier have a same prefix length but have different prefix content.

In this implementation, the location identifiers corresponding to the single-homed network device and the multi-homed network device may be distinguished by using different prefixes or by using different prefix content when prefixes are the same, to dynamically allocate the segment identifiers for the location identifiers corresponding to the single-homed network device and the multi-homed network device.

In a possible implementation, the first network device stores a plurality of location identifier groups, the location identifier groups have different prefix lengths, and the location identifier group to which the first location identifier and the second location identifier belong belongs to the plurality of location identifier groups.

In a possible implementation, the method further includes: The first network device receives a packet that is sent by a fifth network device and forwarded by the fourth network device, where a destination network device of the packet is the second network device, and a link between the first network device and the fifth network device fails. The first network device sends the packet to the second network device based on the first segment identifier.

In this implementation, in the scenario in which single-homing and multi-homing coexist, it can be ensured that traffic to be sent to the single-homed network device is not interrupted.

According to a second aspect, the embodiments may provide a routing information processing method, including: A first network device receives routing information from a second network device, where the routing information includes a first segment identifier corresponding to a third network device and a second segment identifier corresponding to a fourth network device. The first network device obtains a first identifier and routing information corresponding to the third network device, where the first identifier exists only in a remote route corresponding to the third network device, and the first identifier includes a first Ethernet segment identifier (ESI) or a first destination Internet protocol (IP) address. The first network device obtains a second identifier and routing information corresponding to the fourth network device, where the second identifier exists in a local route and a remote route that correspond to the fourth network device, and the second identifier includes a second ESI or a second destination IP address. The first network device advertises mirror routing information for the second network device, where the mirror routing information includes the second segment identifier but does not include the first segment identifier; or the mirror routing information includes a second location identifier corresponding to the second segment identifier but does not include a first location identifier corresponding to the first segment identifier.

In the method, the first network device sets up mirror protection for the second segment identifier or the second location identifier of the fourth network device as a multi-homed network device and sets up no mirror protection for the first segment identifier or the first location identifier of the third network device as a single-homed network device. In this way, in a scenario in which single-homing and multi-homing coexist, if the second network device does not fail, the first network device may check, for a packet to be sent to the third network device, whether a link to the third network device fails. When the link does not fail, the packet may be successfully sent to the third network device through the second network device. This ensures that traffic of a failure-free single-homed network device is not interrupted in the scenario in which single-homing and multi-homing coexist and implements effective protection in both a single-homing scenario and a multi-homing scenario.

In a possible implementation, the second segment identifier corresponds to the second location identifier, and that the first network device advertises mirror routing information for the second network device includes: The first network device advertises, based on the second location identifier corresponding to the second segment identifier, the mirror routing information for the second network device, where the mirror routing information includes the second location identifier, but does not include the first location identifier corresponding to the first segment identifier.

Because the second location identifier may correspond to segment identifiers including the second segment identifier that are of a plurality of multi-homed network devices, the mirror protection is declared based on the second location identifier, so that the plurality of multi-homed network devices may be protected by advertising one piece of mirror protection information. This improves network management efficiency and saves network resources.

In a possible implementation, before that a first network device receives routing information from a second network device, the method further includes: The first network device sends the routing information corresponding to the fourth network device, where the routing information includes the second identifier, the second identifier includes the second ESI or the second destination IP address, the second ESI identifies the fourth network device, and the second destination IP address points to the fourth network device.

In a possible implementation, if ESI deployment is supported, the second identifier includes the second ESI; or if ESI deployment is not supported, the second identifier includes the second destination IP address.

In a possible implementation, after that the first network device advertises mirror routing information for the second network device, the method further includes: The first network device receives a packet sent by a fifth network device, where a destination network device of the packet is the third network device, and a link between the second network device and the fifth network device fails. The first network device sends the packet to the second network device.

According to a third aspect, an embodiment may further provide a routing information processing apparatus. The routing information processing apparatus has a function of implementing a network device according to any one of the first aspect or the method implementations of the first aspect and includes corresponding elements or structure for performing steps or functions described in each corresponding method. The steps or the functions may be implemented by using software, hardware (for example, a circuit), or a combination of hardware and software. The network device includes a first network device.

In a possible implementation, the apparatus includes one or more processing units and a transceiver unit. The one or more processing units are configured to support the apparatus to perform corresponding functions of the network device in the foregoing method.

The transceiver unit may be configured to obtain a local route corresponding to a second network device, where the local route includes a first identifier, the first identifier includes a first Ethernet segment identifier (ESI) or a first destination Internet protocol (IP) address, the first ESI identifies the second network device, and the first destination IP address points to the second network device.

The processing unit is configured to allocate, based on the fact that the first identifier exists only in the local route, a first segment identifier corresponding to the second network device.

The transceiver unit is further configured to obtain a local route and a remote route that correspond to a third network device, where each of the local route and the remote route includes a second identifier, the second identifier includes a second ESI or a second destination IP address, the second ESI identifies the third network device, and the second destination IP address points to the third network device.

The processing unit is further configured to allocate, based on the fact that the second identifier exists at least in the local route and the remote route, a second segment identifier corresponding to the third network device.

The transceiver unit is further configured to send routing information, where the routing information includes the first segment identifier and the second segment identifier.

In a possible implementation, the processing unit is configured to: if ESI deployment is supported, allocate, based on the fact that the first ESI exists only in the local route, the first segment identifier corresponding to the second network device, where the first identifier is the first ESI; or if ESI deployment is not supported, allocate, based on the fact that the first destination IP address exists only in the local route, the first segment identifier corresponding to the second network device, where the first identifier is the first destination IP address.

In a possible implementation, the processing unit is configured to: if the ESI deployment is supported, allocate, based on the fact that the second ESI exists at least in the local route and the remote route, the second segment identifier corresponding to the third network device, where the second identifier is the second ESI; or if the ESI deployment is not supported, allocate, based on the fact that the second destination IP address exists at least in the local route and the remote route, the second segment identifier corresponding to the third network device, where the second identifier is the second destination IP address.

In a possible implementation, the transceiver unit is configured to send the routing information to a fourth network device, where the remote route is received by the first network device from the fourth network device.

In a possible implementation, the first segment identifier corresponds to a first location identifier, the second segment identifier corresponds to a second location identifier, the first location identifier and the second location identifier belong to a same location identifier group, and the first location identifier is different from the second location identifier.

In a possible implementation, the first location identifier and the second location identifier have different prefix lengths; or the first location identifier and the second location identifier have a same prefix length but have different prefix content.

In a possible implementation, the first network device stores a plurality of location identifier groups, the location identifier groups have different prefix lengths, and the location identifier group to which the first location identifier and the second location identifier belong belongs to the plurality of location identifier groups.

In a possible implementation, the transceiver unit is further configured to: receive a packet that is sent by a fifth network device and forwarded by the fourth network device, where a destination network device of the packet is the second network device, and a link between the first network device and the fifth network device fails; and send the packet to the second network device based on the first segment identifier.

According to a fourth aspect, an embodiment may further provide a routing information processing apparatus. The routing information processing apparatus has a function of implementing a network device according to any one of the second aspect or the method implementations of the second aspect and includes corresponding elements or structure for performing steps or functions described in each corresponding method. The steps or the functions may be implemented by using software, hardware (for example, a circuit), or a combination of hardware and software. The network device includes a first network device.

In a possible implementation, the apparatus includes one or more processing units and a transceiver unit. The one or more processing units are configured to support the apparatus to perform corresponding functions of the network device in the foregoing method.

The transceiver unit may be configured to: receive routing information from a second network device, where the routing information includes a first segment identifier corresponding to a third network device and a second segment identifier corresponding to a fourth network device; obtain a first identifier and routing information corresponding to the third network device, where the first identifier exists only in a remote route corresponding to the third network device, and the first identifier includes a first Ethernet segment identifier (ESI) or a first destination Internet protocol (IP) address; obtain a second identifier and routing information corresponding to the fourth network device, where the second identifier exists in a local route and a remote route that correspond to the fourth network device, and the second identifier includes a second ESI or a second destination IP address.

The processing unit is configured to advertise mirror routing information for the second network device, where the mirror routing information includes the second segment identifier but does not include the first segment identifier; or the mirror routing information includes a second location identifier corresponding to the second segment identifier but does not include a first location identifier corresponding to the first segment identifier.

In a possible implementation, the second segment identifier corresponds to the second location identifier, and the processing unit is configured to advertise, based on the second location identifier corresponding to the second segment identifier, the mirror routing information for the second network device, where the mirror routing information includes the second location identifier, but does not include the first location identifier corresponding to the first segment identifier.

In a possible implementation, the transceiver unit is further configured to: before receiving the routing information from the second network device, send the routing information corresponding to the fourth network device, where the routing information includes the second identifier, the second identifier includes the second ESI or the second destination IP address, the second ESI identifies the fourth network device, and the second destination IP address points to the fourth network device.

In a possible implementation, if ESI deployment is supported, the second identifier includes the second ESI; or if ESI deployment is not supported, the second identifier includes the second destination IP address.

In a possible implementation, the transceiver unit is further configured to: after advertising the mirror routing information for the second network device, receive a packet sent by a fifth network device, where a destination network device of the packet is the third network device, and a link between the second network device and the fifth network device fails; and send the packet to the second network device.

According to a fifth aspect, an embodiment may further provide a routing information processing apparatus. The routing information processing apparatus includes a processor and a memory, and the processor is coupled to the memory.

The memory is configured to store a computer program.

The processor is configured to execute the computer program stored in the memory, to enable the apparatus to perform the following operations: obtaining a local route corresponding to a second network device, where the local route includes a first identifier, the first identifier includes a first Ethernet segment identifier (ESI) or a first destination Internet protocol (IP) address, the first ESI identifies the second network device, and the first destination IP address points to the second network device; allocating, based on the fact that the first identifier exists only in the local route, a first segment identifier corresponding to the second network device; obtaining a local route and a remote route that correspond to a third network device, where each of the local route and the remote route includes a second identifier, the second identifier includes a second ESI or a second destination IP address, the second ESI identifies the third network device, and the second destination IP address points to the third network device; allocating, based on the fact that the second identifier exists at least in the local route and the remote route, a second segment identifier corresponding to the third network device; and sending routing information, where the routing information includes the first segment identifier and the second segment identifier.

In a possible implementation, the processor is configured to execute the computer program, to perform the following operations: if ESI deployment is supported, allocating, based on the fact that the first ESI exists only in the local route, the first segment identifier corresponding to the second network device, where the first identifier is the first ESI; or if ESI deployment is not supported, allocating, based on the fact that the first destination IP address exists only in the local route, the first segment identifier corresponding to the second network device, where the first identifier is the first destination IP address.

In a possible implementation, the processor is configured to execute the computer program, to perform the following operations: if the ESI deployment is supported, allocating, based on the fact that the second ESI exists at least in the local route and the remote route, the second segment identifier corresponding to the third network device, where the second identifier is the second ESI; or if the ESI deployment is not supported, allocating, based on the fact that the second destination IP address exists at least in the local route and the remote route, the second segment identifier corresponding to the third network device, where the second identifier is the second destination IP address.

In a possible implementation, the processor is configured to execute the computer program, to perform the following operation: sending the routing information to a fourth network device, where the remote route is received by a first network device from the fourth network device.

In a possible implementation, the first segment identifier corresponds to a first location identifier, the second segment identifier corresponds to a second location identifier, the first location identifier and the second location identifier belong to a same location identifier group, and the first location identifier is different from the second location identifier.

In a possible implementation, the first location identifier and the second location identifier have different prefix lengths; or the first location identifier and the second location identifier have a same prefix length but have different prefix content.

In a possible implementation, the first network device stores a plurality of location identifier groups, the location identifier groups have different prefix lengths, and the location identifier group to which the first location identifier and the second location identifier belong belongs to the plurality of location identifier groups.

In a possible implementation, the processor is further configured to execute the computer program, to perform the following operations: receiving a packet that is sent by a fifth network device and forwarded by the fourth network device, where a destination network device of the packet is the second network device, and a link between the first network device and the fifth network device fails; and sending the packet to the second network device based on the first segment identifier.

According to a sixth aspect, an embodiment may further provide a routing information processing apparatus. The routing information processing apparatus includes a processor and a memory, and the processor is coupled to the memory.

The memory is configured to store a computer program.

The processor is configured to execute the computer program stored in the memory, to enable the apparatus to perform the following operations: receiving routing information from a second network device, where the routing information includes a first segment identifier corresponding to a third network device and a second segment identifier corresponding to a fourth network device; obtaining a first identifier and routing information corresponding to the third network device, where the first identifier exists only in a remote route corresponding to the third network device, and the first identifier includes a first Ethernet segment identifier (ESI) or a first destination Internet protocol (IP) address; obtaining a second identifier and routing information corresponding to the fourth network device, where the second identifier exists in a local route and a remote route that correspond to the fourth network device, and the second identifier includes a second ESI or a second destination IP address; and advertising mirror routing information for the second network device, where the mirror routing information includes the second segment identifier, but does not include the first segment identifier; or the mirror routing information includes a second location identifier corresponding to the second segment identifier, but does not include a first location identifier corresponding to the first segment identifier.

In a possible implementation, the second segment identifier corresponds to the second location identifier, and the processor is configured to execute the computer program, to perform the following operation: advertising, based on the second location identifier corresponding to the second segment identifier, the mirror routing information for the second network device, where the mirror routing information includes the second location identifier, but does not include the first location identifier corresponding to the first segment identifier.

In a possible implementation, the processor is further configured to execute the computer program, to perform the following operation: before receiving the routing information from the second network device, sending the routing information corresponding to the fourth network device, where the routing information includes the second identifier, the second identifier includes the second ESI or the second destination IP address, the second ESI identifies the fourth network device, and the second destination IP address points to the fourth network device.

In a possible implementation, if ESI deployment is supported, the second identifier includes the second ESI; or if ESI deployment is not supported, the second identifier includes the second destination IP address.

In a possible implementation, the processor is further configured to execute the computer program, to perform the following operations: after advertising the mirror routing information for the second network device, receiving a packet sent by a fifth network device, where a destination network device of the packet is the third network device, and a link between the second network device and the fifth network device fails; and sending the packet to the second network device.

According to a seventh aspect, an embodiment may provide a computer-readable storage medium. The computer-readable storage medium stores instructions; and when the instructions are run on a computer, the computer is enabled to perform the method according to any one of the first aspect, the second aspect, the possible implementations of the first aspect, or the possible implementations of the second aspect.

According to an eighth aspect, an embodiment may provide a computer program product. The computer program product includes computer program code. When the computer program code is run on a computer, the computer is enabled to perform the method according to any one of the first aspect, the second aspect, the possible implementations of the first aspect, or the possible implementations of the second aspect.

DETAILED DESCRIPTION OF THE EMBODIMENTS

Figure 1:
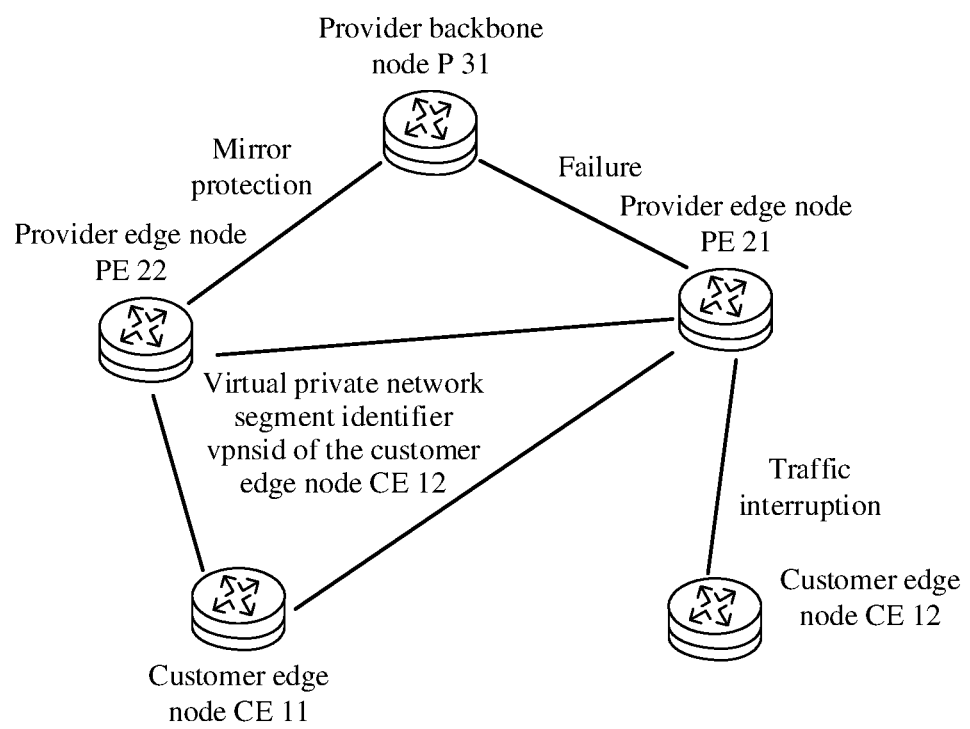
FIG. 1 is a schematic diagram of a network.

The following further describes the embodiments in detail with reference to accompanying drawings.

All aspects, embodiments, or features are presented by describing a system that may include a plurality of devices, components, modules, or the like. It should be appreciated and understood that each system may include another device, component, module, or the like, and/or may not include all devices, components, modules, or the like discussed with reference to the accompanying drawings. In addition, a combination of these solutions may be applied.

In addition, the term "for example" in the embodiments is used to represent giving an example, an illustration, or description. Any embodiment described as "for example" should not be explained as being more preferred or having more advantages than another embodiment. The term "for example" is used to present a concept.

A network architecture and a service scenario are intended to describe in the embodiments more clearly, and do not constitute a unique limitation on the embodiments. A person of ordinary skill in the art may know that: With evolution of the network architecture and emergence of new service scenarios, the embodiments are also applicable to similar problems.

The following describes some terms in the embodiments, to help a person skilled in the art have a better understanding.

(1) Virtual private network (VPN): The VPN may include a customer edge (CE) node, a provider edge (PE) node, and a provider backbone (P) node. The PE on a network side may be directly connected to the CE on a user side, and is responsible for VPN service access, routing information processing, and the like. The P node is responsible for forwarding data and is not directly connected to the CE. The P node may be directly connected to the PE and/or another P. In the embodiments, the VPN may also be referred to as a network for short.

In a possible example, the VPN may be an Ethernet virtual private network (EVPN) scenario and/or a Layer 3 virtual private network (L3VPN) scenario.

(2) Segment routing (SR) protocol: The SR protocol is a new protocol proposed based on an interior gateway protocol (IGP). In the SR protocol, a segment identifier (SID) may be used to identify a network device, so that another network device forwards a packet based on a SID label carried in the packet.

(3) Single-homing and multi-homing: In the embodiments, the single-homing means that a CE is connected to only one PE, and also means that the CE is single-homed to one PE. The multi-homing means that a CE is connected to a plurality of PEs, and also means that the CE is multi-homed to the plurality of PEs. If both the single-homing and the multi-homing occur in a network, it means that the single-homing and the multi-homing coexist in the network. In the embodiments, if a network device A is single-homed to another network device, the network device A is also referred to as a single-homed node, a single-homed network device, or a single-homed device. If a network device B is multi-homed to other network devices, the network device B is also referred to as a multi-homed node, a multi-homed network device, or a multi-homed device. The multi-homing means that the network device B is simultaneously homed to two or more network devices.

(4) Virtual routing and forwarding (vrf) table: The VRF table is also referred to as a VPN routing and forwarding table or a VPN instance, and is a dedicated entity established and maintained by a PE for a directly connected site. Each site has a corresponding VRF table on the PE, and the site may include, for example, a CE and/or a P. In addition, each VRF table may be considered as a virtual router, and includes an independent routing table, a set of interfaces belonging to the VRF table, and a set of routing protocols specially used for the VRF table. The VRF table may indicate a service accessed by a user. For example, a VRF table 1 indicates that the user accesses a service 1, and a VRF table 2 indicates that the user accesses a service 2. If the VRF table 1 and the VRF table 2 are different, it indicates that the services accessed by the user are different.

For example, the VRF table may be classified into an EVPN instance and/or an L3VPN instance based on different scenarios. In the embodiments, the EVPN instance or the L3VPN instance is also represented by an EVPN/L3VPN instance.

The term "and/or" describes an association relationship between associated objects and represents that three relationships may exist. For example, A and/or B may represent the following three cases: Only A exists, both A and B exist, and only B exists. The character "|" generally indicates an "or" relationship between associated objects.

"A plurality of" means two or more.

In addition, it should be understood that in description, terms such as "first" and "second" are merely used for distinguishing and description but should not be understood as indicating or implying relative importance or should not be understood as indicating or implying a sequence.

For ease of understanding the embodiments, the following describes an application scenario of the embodiments.

In an IP traffic forwarding scenario, an egress protection solution is proposed for a failure of an egress node. FIG. 1 is used as an example to describe the egress protection solution. A CE 11 is dual-homed to a PE 21 and a PE 22, and a CE 12 is single-homed to the PE 21. The PE 21 configures a virtual private network segment identifier (vpnsid). The PE 21 advertises routing information by using the vpnsid, in other words, the routing information advertised by the PE 21 carries the vpnsid, where the routing information is media access control (MAC) routing information in an EVPN Layer 2 scenario, and is IP address routing information in an EVPN Layer 3 scenario. The IP address routing information may be, for example, border gateway protocol (BGP)—based prefix routing information. The PE 22 allocates a mirror segment identifier (mirror-sid), and advertises mirror information, to declare protection of a location identifier of the PE 21. A P node 31 receives the mirror routing information advertised by the PE 22. The mirror routing information is used to set up a mirror protection relationship for the PE 21. For example, the protection relationship may be a fast reroute (FRR) protection relationship. The mirror routing information includes, for example, the mirror-sid allocated by the PE 22 and the vpnsid allocated by the PE 21 or includes the mirror-sid allocated by the PE 22 and a location identifier (locator) corresponding to the vpnsid allocated by the PE 21.

In the egress protection solution, in scenarios in which single-homing and multi-homing coexist and a failure occurs, for example, a common failure scenario in which a link between the PE 21 and the P node 31 fails and a common failure scenario in which the PE 21 fails, the P node 31 senses that the failure occurs, and performs mirror protection, to encapsulate the vpnsid allocated by the PE 21 into a received packet, and send an encapsulated packet to the PE 22. The PE 22 queries a routing outbound interface based on the mirror-sid that is allocated by the PE 22 and encapsulated in the packet. If the packet is to be sent to the CE 11, the PE 22 finds that the routing outbound interface points to the CE 11 and sends the packet to the CE 11. If the packet is to be sent to the CE 12, the PE 22 finds that the routing outbound interface is null, and directly discards the packet. However, if the link between the PE 21 and the P node 31 fails, but the PE 21 does not fail, the packet may originally reach the PE 21 through the PE 22 and then reach the CE 13, but the PE 22 discards the packet. This causes traffic interruption of a failure-free single-homed network device in a scenario in which single-homing and multi-homing coexist.

To resolve the problem of the traffic interruption of the failure-free single-homed network device in the scenario in which single-homing and multi-homing coexist, in a possible solution, it may be restricted that single-homing and dual-homing cannot coexist in a same EVPN instance or L3VPN instance in a network. However, vendors cannot require users to distribute the single-homing and the dual-homing to different EVPN instances or L3VPN instances during actual deployment. Therefore, the problem still exists.

In view of this, to avoid the traffic interruption of the failure-free single-homed network device in the scenario in which single-homing and multi-homing coexist, the embodiments may provide a routing information processing method. In the method, a first network device allocates, based on a local route corresponding to a second network device, a first segment identifier corresponding to the second network device, where the first segment identifier corresponds to a first location identifier. The first network device allocates, based on a local route and a remote route that correspond to a third network device, a second segment identifier corresponding to the third network device, where the second segment identifier corresponds to a second location identifier. The first network device sends routing information, where the routing information includes the first segment identifier and the second segment identifier. A fourth network device may receive the routing information and advertises mirror routing information for the first network device, where the mirror routing information includes the second segment identifier but does not include the first segment identifier; or the mirror routing information includes the second location identifier corresponding to the second segment identifier but does not include the first location identifier corresponding to the first segment identifier. According to the method, the fourth network device sets up mirror protection for the second segment identifier or the second location identifier of the third network device as a multi-homed network device and sets up no mirror protection for the first segment identifier or the first location identifier of the second network device as a single-homed network device. In this way, in the scenario in which single-homing and multi-homing coexist, if the first network device does not fail, whether a link to the second network device fails may be checked for a packet to be sent to the second network device. When the link does not fail, the packet may be successfully sent to the second network device through the first network device. This ensures that traffic of the failure-free single-homed network device is not interrupted in the scenario in which single-homing and multi-homing coexist.

A network device may include one or more of a PE, a P, or a CE. The network device may be a router or a switch. Optionally, the network device may support an SR protocol.

An embodiment may provide a routing information processing method. The method may be applied to the network shown in FIG. 1. In an actual possible scenario, the network may further include another network device. This is not limited herein. The following describes a routing information processing process in detail with reference to FIG. 2. For ease of understanding, in a possible example, as shown in the network in FIG. 1, a first network device may be the PE 21, a second network device may be the CE 12, a third network device may be the CE 11, a fourth network device may be the PE 22, and a fifth network device is the P node 31. The process shown in FIG. 2 includes the following steps.

S201: The first network device obtains a local route corresponding to the second network device, where the local route includes a first identifier, the first identifier includes a first Ethernet segment identifier (ESI) or a first destination IP address, the first ESI identifies the second network device, and the first destination IP address points to the second network device.

After identifying that the second network device locally accesses the first network device, the first network device determines the first identifier of the second network device. The first identifier determined by the first network device may vary depending on whether ESI deployment is supported. For example, if the ESI deployment is supported, the first identifier includes the first ESI; or if the ESI deployment is not supported, the first identifier includes the first destination IP address. The first ESI identifies the second network device, and the first destination IP address points to the second network device. Optionally, the first destination IP address may be an IP address of the second network device or may be an IP address of user equipment connected to the second network device.

For example, if the ESI deployment is supported, a VPN may be an EVPN scenario, where the EVPN scenario includes an EVPN Layer 2 scenario and an EVPN Layer 3 scenario, a route corresponding to the EVPN scenario is an Ethernet segment-automatic discovery (ES-AD) route, a service route corresponding to the EVPN Layer 2 scenario is a MAC route, and a service route corresponding to the EVPN Layer 3 scenario is a prefix route; or if the ESI deployment is not supported, a VPN may be an L3VPN scenario, a route corresponding to the L3VPN scenario is an IP address route, and a service route corresponding to an L3VPN is a prefix route.

In this embodiment, a local route is a route learned by a PE from a CE directly connected to the PE, and a remote route is a route learned by a PE from another PE connected to the PE, for example, a neighboring PE of the PE.

The first network device may obtain, from an obtained local route and an obtained remote route, the local route corresponding to the second network device, and determine that the first identifier exists in the local route corresponding to the second network device, that is, the second network device is connected only to the first network device.

If the ESI deployment is supported, the first identifier may be the first ESI, and the local route corresponding to the second network device may be, for example, a local ES-AD route.

If the ESI deployment is not supported, the first identifier is, for example, the first destination IP address, and the local route corresponding to the second network device may be, for example, a prefix route corresponding to the first destination IP address.

S202: The first network device allocates, based on the fact that the first identifier exists only in the local route, a first segment identifier corresponding to the second network device.

The first segment identifier corresponds to a first location identifier, and the first location identifier may be a first location identifier corresponding to a single-homed network device.

The first network device may determine, based on the fact that the first identifier exists only in the local route, that the first network device is a single-homing device of the second network device, that is, the second network device is single-homed to the first network device, and the second network device is a single-homed network device. For example, in FIG. 1, the CE 12 is single-homed to the PE 21. After determining that the first network device is the single-homing device of the second network device, the first network device may allocate, based on the first location identifier, the first segment identifier corresponding to the second network device.

When the ESI deployment is supported, the first identifier is the first ESI, and the first network device determines, based on the fact that the first ESI exists only in the local route, that the first network device is the single-homing device of the second network device, and allocates the first segment identifier corresponding to the second network device; or if the ESI deployment is not supported, the first identifier is the first destination IP address, and the first network device determines, based on the fact that the first destination IP address exists only in the local route, that the first network device is the single-homing device of the second network device, and allocates the first segment identifier corresponding to the second network device.

In a possible implementation, the first location identifier may be used to determine a value range of the first segment identifier to be allocated to the single-homed network device, to improve efficiency of managing a segment identifier by a network device and improve management convenience of the device. In a possible implementation, for example, the first location identifier may be configured as locator loc1 100::64 static 32 single-home, where locator loc1 represents the first location identifier; 100::64 represents a prefix; 100::in 100::64 represents a prefix segment, or may be referred to as prefix content; 64 in 100::64 indicates that a prefix segment length is 64, and the prefix segment length may also be referred to as a prefix length; static in static 32 represents a static segment; 32 in static 32 indicates that a static segment length is 32; and single-home is used to identify that the first location identifier is a location identifier corresponding to the single-homed network device. locator loc1 100:64 static 32 single-home may also be referred to as a first location identifier pool. The first network device allocates the first segment identifier to the single-homed second network device based on the value range that is of the segment identifier and that is limited by the first location identifier pool, where the first segment identifier may be, for example, 100:1 or 100:2.

It should be noted that for different VRF tables, that is, for different EVPN instances and/or different L3VPN instances, although the first network device allocates the segment identifier to the second network device based on the first location identifier, the segment identifier allocated to the second network device may vary with different instances. For example, for different instances, namely, a VRF table 41 and a VRF table 42, the first network device may allocate different segment identifiers, namely, 100:1 and 100:2, to the second network device. Alternatively, as required, the first network device may plan a plurality of location identifiers used for the single-homed network device, and the location identifiers are not limited to locator loc1 in the foregoing example.

The first segment identifier allocated by the first network device based on the first location identifier may be a static identifier or a dynamic identifier. The first segment identifier as a static identifier may be, for example, directly configured, and falls within the value range of the first location identifier. The first segment identifier as a dynamic identifier may be, for example, automatically allocated based on the first location identifier. In a possible implementation, the static first segment identifier may be configured through an EVPN opcode operation. For example, a user manually configures a location identifier as the first location identifier and configures a static identifier through the opcode operation. The first network device determines the first segment identifier based on the static identifier configured through the opcode operation. In another possible implementation, the dynamic first segment identifier is configured through an intermediate system-to-intermediate system (IS-IS) operation. For example, a user manually configures a location identifier as the first location identifier and performs the IS-IS operation. The first network device automatically allocates a corresponding dynamic identifier as the first segment identifier. In addition, optionally, the first network device configures the first segment identifier of the second network device in a static manner. If determining that the first segment identifier is not statically configured, the first network device automatically and dynamically allocates the first segment identifier of the second network device based on the first location identifier.

S203: The first network device obtains a local route and a remote route that correspond to the third network device, where each of the local route and the remote route includes a second identifier, the second identifier includes a second ESI or a second destination IP address, the second ESI identifies the third network device, and the second destination IP address points to the third network device.

After identifying that the third network device locally accesses the first network device, the first network device determines the second identifier of the third network device. The second identifier obtained by the first network device may vary depending on whether the ESI deployment is supported. For example, if the ESI deployment is supported, the second identifier includes the second ESI; or if the ESI deployment is not supported, the second identifier includes the second destination IP address. The second ESI identifies the third network device, and the second destination IP address points to the third network device. Optionally, the second destination IP address may be an IP address of the third network device or may be an IP address of user equipment connected to the third network device.

The first network device may further receive one or more remote routes, the one or more remote routes include third routing information received from the fourth network device, and the third routing information may include the second identifier of the third network device.

The first network device determines that the second identifier exists in both the local route and the remote route that correspond to the third network device, that is, the third network device is connected to a plurality of network devices including the first network device.

If the ESI deployment is supported, the second identifier may be the second ESI, the local route corresponding to the third network device may be, for example, a local ES-AD route, and the remote route corresponding to the third network device may be, for example, a remote ES-AD route.

If the ESI deployment is not supported, the second identifier may be, for example, the second destination IP address, and the local route and the remote route that correspond to the third network device may be, for example, a local prefix route and a remote prefix route that correspond to the second destination IP address.

S204: The first network device allocates, based on the fact that the second identifier exists at least in the local route and the remote route, a second segment identifier corresponding to the third network device.

The second segment identifier corresponds to a second location identifier, and the second location identifier may be a second location identifier corresponding to a multi-homed network device.

The first network device may determine, based on the fact that the second identifier exists at least in the local route and the remote route, in other words, the second identifier exists in the local and remote routes, that the first network device is a multi-homing device of the third network device, that is, the third network device is multi-homed to the first network device and at least one other network device, and the third network device is a multi-homed network device. For example, in FIG. 1, the CE 11 is multi-homed to the PE 21 and the PE 22. After determining that the first network device is the multi-homing device of the third network device, the first network device may allocate, based on the second location identifier, the second segment identifier corresponding to the third network device.

If the ESI deployment is supported, the second identifier is the second ESI, and the first network device determines, based on the fact that the second ESI exists at least in the local route and the remote route, that the first network device is the multi-homing device of the third network device, and allocates the second segment identifier corresponding to the third network device; or if the ESI deployment is not supported, the second identifier is the second destination IP address, and the first network device determines, based on the fact that the second destination IP address exists at least in the local route and the remote route, that the first network device is the multi-homing device of the third network device, and allocates the second segment identifier corresponding to the third network device.

In a possible implementation, the second location identifier may be used to determine a value range of the second segment identifier to be allocated to the multi-homed network device. In a possible implementation, for example, the second location identifier may be configured as locator loc2 200::64 static 64 multi-home, where locator loc2 represents the second location identifier; 200::64 represents a prefix; 200::in 200::64 represents a prefix segment, or may be referred to as prefix content; 64 in 200::64 indicates that a prefix segment length is 64, and the prefix segment length may also be referred to as a prefix length; static in static 64 represents a static segment; 64 in static 64 indicates that a static segment length is 64; and multi-home is used to indicate that the second location identifier is a location identifier corresponding to the multi-homed network device. locator loc2 200:64 static 64 multi-home may also be referred to as a second location identifier pool. The first network device allocates the second segment identifier to the multi-homed third network device based on the value range that is of the segment identifier and that is limited by the second location identifier pool, where the second segment identifier may be, for example, 200:1 or 200:2.

It should be noted that for different VRF tables, that is, for different EVPN instances and/or different L3VPN instances, although the first network device allocates the segment identifier to the third network device based on the second location identifier, the segment identifier allocated to the third network device may vary with different instances. For example, for different instances, namely, the VRF table 41 and the VRF table 42, the first network device may allocate different segment identifiers, namely, 200:1 and 200:2, to the third network device. Alternatively, as required, the first network device may plan a plurality of location identifiers used for the multi-homed network device, and the location identifiers are not limited to locator loc2 in the foregoing example.

In this embodiment, a location identifier group can be configured, and a plurality of different location identifiers may be configured in the location identifier group. For example, the first location identifier and the second location identifier belong to a same location identifier group, and the first location identifier is different from the second location identifier. Optionally, the location identifier group may be represented by locator-group.

For example: locator-group group1
locator loc1 100:64 static 32 single-home
locator loc2 200:64 static 64 multi-home, where locator-group group1 represents a first location identifier group, locator loc1 100:64 static 32 single-home represents the first location identifier, and locator loc2 200:64 static 64 multi-home represents the second location identifier.

In this embodiment, the location identifier group may be understood as a label. In a possible implementation, the location identifier group may not occupy a system resource of a location identifier, but each location identifier in the location identifier group occupies a system resource. In a possible implementation, for a VRF table in which single-homing and multi-homing coexist, the first network device may configure a location identifier group corresponding to the VRF table. Therefore, the first network device may configure and store different location identifier groups for different VRF tables. In a possible implementation, for a VRF table in which single-homing and multi-homing do not coexist, namely, a VRF table with only single-homing or a VRF table with only multi-homing, the first network device may not configure a corresponding location identifier group. Such a VRF table for which no location identifier group is configured may also be referred to as a non-location identifier group. Optionally, the non-location identifier group includes only the first location identifier corresponding to the single-homed network device or includes only the second location identifier corresponding to the multi-homed network device.

A difference between the first location identifier and the second location identifier lies in: The first location identifier and the second location identifier may have different prefix lengths; or the first location identifier and the second location identifier may have a same prefix length but have different prefix content.

The first network device may first configure the location identifier group, and then configure the location identifiers in the location identifier group. The first network device may store a plurality of location identifier groups, the location identifier groups have different prefix lengths, and the location identifier group to which the first location identifier and the second location identifier belong belongs to the plurality of location identifier groups.

For different location identifier groups, every two location identifier groups may have different prefix lengths. For example, the first network device stores locator-group group1 and locator-group group2. locator-group group1 includes locator loc1 and locator loc2, locator loc1 is a location identifier corresponding to the single-homed network device, and locator loc2 is a location identifier corresponding to the multi-homed network device. locator-group group2 includes locator loc3 and locator loc4, locator loc3 is a location identifier corresponding to the single-homed network device, and locator loc4 is a location identifier corresponding to the multi-homed network device. Differences between prefix lengths of locator-group group1 and locator-group group2 lie in: Prefix lengths of locator loc1 and locator loc3 are different, prefix lengths of locator loc1 and locator loc4 are different, prefix lengths of locator loc2 and locator loc3 are different, and prefix lengths of locator loc2 and locator loc are different.

Optionally, prefix lengths of the location identifier group and the non-location identifier group are also different. For example, the first network device stores locator-group group1 and locator-group group3. locator-group group1 includes locator loc1 and locator loc2, locator loc1 is a location identifier corresponding to the single-homed network device, and locator loc2 is a location identifier corresponding to the multi-homed network device. locator-group group3 includes locator loc5, locator-group group3 is a non-location identifier group, and locator loc5 is a location identifier corresponding to the single-homed network device. Differences between prefix lengths of locator-group group1 and locator-group group3 lie in: Prefix lengths of locator loc1 and locator loc5 are different, and prefix lengths of locator loc2 and locator loc5 are different.

The first network device allocates the second segment identifier based on the second location identifier. As described above, the second segment identifier may also be a static identifier or a dynamic identifier. If the first location identifier and the second location identifier belong to the first location identifier group, in a possible implementation, the static first segment identifier and the static second segment identifier are configured through the opcode operation. For example, the user manually configures a location identifier group as the first location identifier group, and configures the static first segment identifier and the static second segment identifier through the opcode operation, where the statically configured first segment identifier falls within the value range corresponding to the first location identifier in the first location identifier group, and the statically configured second segment identifier falls within the value range corresponding to the second location identifier in the first location identifier group. In another possible implementation, the dynamic first segment identifier and the dynamic second segment identifier are configured through the IS-IS operation. For example, the user manually configures a location identifier group as the first location identifier group and performs the IS-IS operation. The first network device automatically allocates the dynamic first segment identifier based on the first location identifier in the first location identifier group, and automatically allocates the dynamic second segment identifier based on the second location identifier in the first location identifier group.

S205: The first network device sends routing information, where the routing information includes the first segment identifier and the second segment identifier. The fourth network device receives the routing information.

For example, the routing information may correspond to two routes, and the two routes are separately sent to the fourth network device. The fourth network device receives a first route, where the first route includes the first segment identifier. The first route may further include a device identifier of the second network device. The device identifier of the second network device may be the first ESI or the first destination IP address of the second network device. The fourth network device further receives a second route, where the second route includes the second segment identifier, and may further include a device identifier of the third network device. The device identifier of the third network device may be the second ESI or the second destination IP address of the third network device.

In another possible implementation, for example, the routing information may correspond to one route, and the route is sent to the fourth network device, where the route includes the first segment identifier and the second segment identifier. The route may include a device identifier of the second network device, the first segment identifier corresponding to the device identifier of the second network device, a device identifier of the third network device, and the second segment identifier corresponding to the device identifier of the third network device.

Optionally, if the remote route corresponding to the third network device is received from the fourth network device, the first network device sends the routing information to the fourth network device. Optionally, if the first network device receives a plurality of remote routes, the first network device may separately send the routing information to a plurality of network devices that send the plurality of remote routes.

S206: The fourth network device advertises mirror routing information for the first network device.

The fourth network device determines, based on the received second segment identifier, that the third network device is multi-homed to the first network device and the fourth network device. The fourth network device may generate mirror protection for the first network device based on the second segment identifier.

In a possible implementation, the mirror routing information includes the second segment identifier, but does not include the first segment identifier, to generate the mirror protection for the first network device. For example, the fourth network device advertises the mirror information, and declares the mirror protection for the first network device based on the second segment identifier of the third network device. The mirror information advertised by the fourth network device carries the second segment identifier of the third network device but does not carry the first segment identifier of the second network device.

In another possible implementation, the mirror routing information includes the second location identifier corresponding to the second segment identifier but does not include the first location identifier corresponding to the first segment identifier, to generate the mirror protection for the first network device. For example, the fourth network device advertises the mirror information, and declares the mirror protection for the first network device based on the second location identifier corresponding to the second segment identifier of the third network device. The mirror information advertised by the fourth network device carries the second location identifier but does not carry the first location identifier.

In this way, when a link between the first network device and the fifth network device fails, and/or the first network device fails, a packet destined for the third network device hits the mirror protection, and the fourth network device performs a mirror protection procedure. The fourth network device sends the received packet to the third network device, to ensure that the third network device can normally receive the packet. This avoids traffic interruption.

In addition, optionally, the fourth network device may aggregate a plurality of second segment identifiers corresponding to the second location identifier, to obtain a second location identifier corresponding to the plurality of second segment identifiers. The fourth network device advertises the mirror routing information for the first network device, where the mirror routing information includes the second location identifier obtained through aggregation, but does not include the first location identifier, so that resources can be saved. The plurality of second segment identifiers are segment identifiers corresponding to a plurality of multi-homed network devices.

It should be noted that even though the second segment identifier and the plurality of second segment identifiers correspond to a locator A when being allocated or configured by a transmit end network device, a second location identifier generated by aggregating the second segment identifier and the plurality of second segment identifiers by a receive end network device may be a locator B, where values of the locator A and the locator B are different. For example, if the second segment identifier and the plurality of second segment identifiers have more same bits than the locator A, the locator B generated by aggregating the second segment identifier and the plurality of second segment identifiers is different from the locator A. The second location identifier used by the receive end to advertise a mirror protection route is the locator B.

For a scenario in which a transmission link of a packet destined for the single-homed network device fails, for example, a scenario in which the link between the fifth network device and the first network device fails, if a destination network device of the packet is the second network device, the first network device receives the packet that is sent by the fifth network device and forwarded by the fourth network device, and sends the packet to the second network device based on the first segment identifier.

The packet may reach the fifth network device, and the fifth network device may sense that a link to the second network device fails. Consequently, the packet cannot be sent to the second network device through the link: the fifth network device—the first network device—the second network device. The fifth network device sends the packet to the fourth network device as a backup device, and the fourth network device sends the packet to the first network device. Because the first network device does not fail, the first network device sends the packet to the second network device, where the first network device is the single-homing device of the second network device.

For a scenario in which a transmission link of a packet destined for the multi-homed network device fails, for example, a scenario in which the link between the fifth network device and the first network device fails and/or the first network device fails, if a destination network device of the packet is the third network device, the fifth network device sends the packet to the fourth network device, and the fourth network device sends the packet to the third network device based on the second segment identifier.

The packet may reach the fifth network device, and the fifth network device may sense that a link that is to the third network device through the first network device fails. Consequently, the packet cannot be sent to the third network device through the link: the fifth network device—the first network device—the third network device. The fifth network device determines, based on the second segment identifier of the packet, that the fourth network device has generated the mirror protection for the second segment identifier or the second location identifier corresponding to the second segment identifier. The fifth network device sends the packet to the fourth network device by performing mirror protection, where the fourth network device and the first network device are dual-homing devices of the third network device. After receiving the packet, the fourth network device sends the packet to the third network device.

In addition, if a single-homed/multi-homed state of the second network device or the third network device frequently changes because a link in the network fails or recovers for a plurality of times in a short period of time, the first network device may re-determine the single-homed/multi-homed state of the second network device or the third network device and reallocate a corresponding segment identifier for a plurality of times in the short period of time. This may cause frequent switching between the single-homing and the multi-homing and therefore cause network flapping. Therefore, in a possible implementation, the first network device may re-determine the single-homed/multi-homed state of the second network device and/or the single-homed/multi-homed state of the third network device at an interval of specified time periodicities. After a corresponding time period, if determining that the single-homed/multi-homed state of the second network device and/or the single-homed/multi-homed state of the third network device change/changes, the first network device may reallocate segment identifiers/a segment identifier corresponding to the second network device and/or the third network device. In this way, the time periodicity is set to reduce load of the first network device caused by re-determining the single-homed/multi-homed state and determining the segment identifier for the plurality of times in the short time of period, to prevent the load of the first network device from being excessively large and inhabit the flapping caused by the frequent switching between the single-homing and the multi-homing. This improves reliability of the network device. The time periodicity may be set to any appropriate value, for example, 10 milliseconds (ms).

For example, the first network device may obtain the local route and the remote route once at the interval of specified time periods. The first network device determines whether the first identifier exists only in the local route corresponding to the second network device; and if yes, the first network device determines that the single-homed state of the second network device does not change, and does not need to reallocate a corresponding segment identifier to the second network device; or if no, the first network device determines that the first identifier exists at least in the local route and a remote route that correspond to the second network device, determines that the second network device changes from the single-homed state to the multi-homed state, and reallocates a corresponding third segment identifier to the second network device, where the third segment identifier may correspond to the second location identifier. It should be noted that, in some possible implementations, the third segment identifier reallocated by the first network device may alternatively correspond to another location identifier used for the multi-homed device, where the another location identifier used for the multi-homed device is different from the second location identifier.

For another example, the first network device may alternatively determine whether the second identifier exists at least in the local route and the remote route that correspond to the third network device; and if yes, the first network device determines that the multi-homed state of the third network device does not change, and does not need to reallocate a corresponding segment identifier to the third network device; or if no, and if the first network device finds that the second identifier exists only in the local route corresponding to the third network device, the first network device determines that the third network device changes from the multi-homed state to the single-homed state, and reallocates a corresponding fourth segment identifier to the third network device, where the fourth segment identifier may correspond to the first location identifier. It should be noted that, in some possible implementations, the fourth segment identifier reallocated by the first network device may alternatively correspond to another location identifier used for the single-homed device, where the another location identifier used for the single-homed device is different from the first location identifier.

Figure 3:
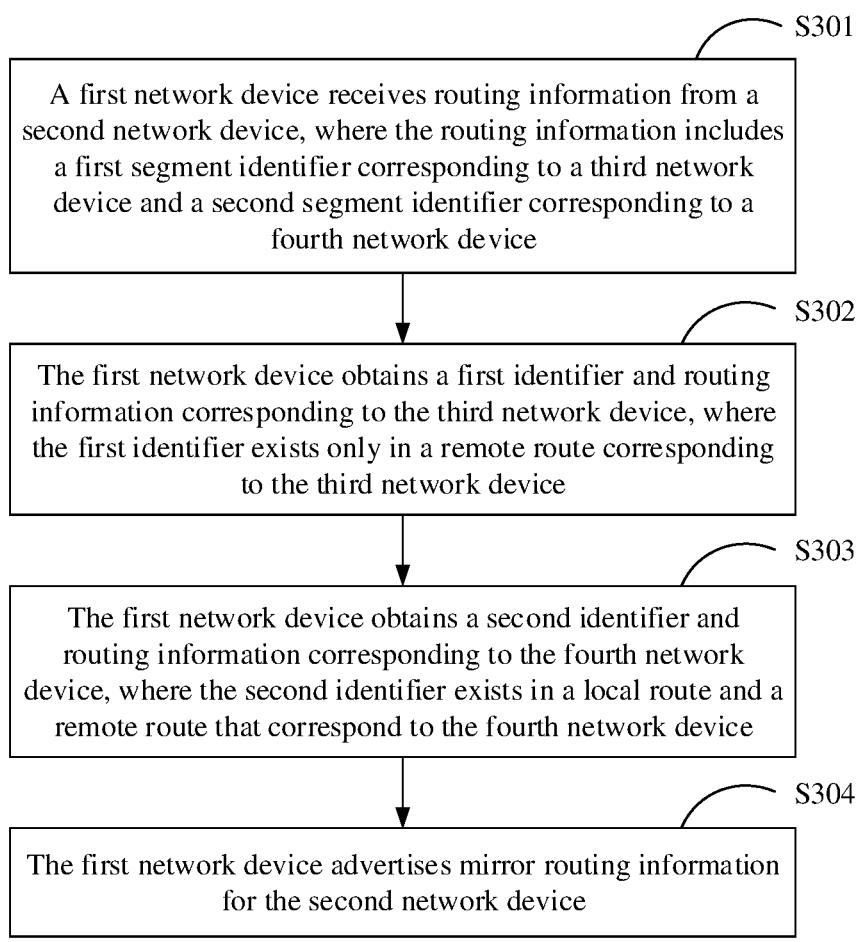
FIG. 3 is a schematic diagram of a routing information processing process according to an embodiment.

Based on the foregoing embodiment, if the first network device is a network device that receives first routing information and/or second routing information, another embodiment may provide a routing information processing method. FIG. 3 is used as an example to describe a routing information processing process in detail. For ease of understanding, in a possible example, as shown in the network in FIG. 1, the first network device may be the PE 22, the second network device may be the PE 21, the third network device may be the CE 12, the fourth network device may be the CE 11, and the fifth network device may be the P node 31. The process shown in FIG. 3 includes the following steps.

S301: The first network device receives routing information from the second network device, where the routing information includes a first segment identifier corresponding to the third network device and a second segment identifier corresponding to the fourth network device.

The first segment identifier corresponds to a first location identifier, and the first location identifier may be a first location identifier corresponding to a single-homed network device. The second segment identifier corresponds to a second location identifier, and the second location identifier may be a second location identifier corresponding to a multi-homed network device.

The routing information may further include a device identifier of the third network device and the second location identifier of the fourth network device, where the first segment identifier corresponds to the device identifier of the third network device, and the second segment identifier corresponds to a device identifier of the fourth network device.

For example, the routing information may correspond to two routes, and the second network device separately sends the two routes to the first network device. The first network device receives a first route, where the first route includes the first segment identifier. The first route may further include the device identifier of the third network device. The device identifier of the third network device may be a first identifier. The first network device further receives a second route, where the second route includes the second segment identifier, and may further include the device identifier of the fourth network device. The device identifier of the fourth network device may be a second identifier.

The first identifier includes a first ESI or a first destination IP address, and the second identifier includes a second ESI or a second destination IP address. Optionally, if ESI deployment is supported, the first identifier includes the first ESI, and the second identifier includes the second ESI; or if ESI deployment is not supported, the first identifier includes the first destination IP address, and the second identifier includes the second destination IP address. For example, the first destination IP address may be included in a BGP protocol-based prefix route, and the second destination IP address may be included in a BGP protocol-based prefix route.

In another possible implementation, for example, the routing information may correspond to one route, and the second network device sends the route to the first network device. The first network device receives the route, where the route includes the first segment identifier and the second segment identifier. The route may include the device identifier of the third network device, the first segment identifier corresponding to the device identifier of the third network device, the device identifier of the fourth network device, and the second segment identifier corresponding to the device identifier of the fourth network device.

The second network device allocates, based on the fact that the first identifier corresponding to the third network device exists only in a local route corresponding to the third network device, the first segment identifier corresponding to the third network device. For this process, refer to S201 and S202 in FIG. 2. Details are not described herein again.

The second network device allocates, based on the fact that the second identifier corresponding to the fourth network device exists at least in a local route and a remote route that correspond to the fourth network device, the second segment identifier corresponding to the fourth network device. For this process, refer to S202 and S204 in FIG. 2. Details are not described herein again.

S302: The first network device obtains the first identifier and routing information corresponding to the third network device, where the first identifier exists only in a remote route corresponding to the third network device.

The first network device determines, based on the fact that the first identifier exists only in the remote route corresponding to the third network device, that the third network device is not a multi-homed device of the first network device.

S303: The first network device obtains the second identifier and routing information corresponding to the fourth network device, where the second identifier exists in a local route and a remote route that correspond to the fourth network device.

The first network device determines, based on the fact that the second identifier exists at least in the local route and the remote route that correspond to the fourth network device, that the fourth network device is a multi-homed device of the first network device, and determines that the fourth network device is a multi-homed device of both the first network device and the second network device.

Figure 2:
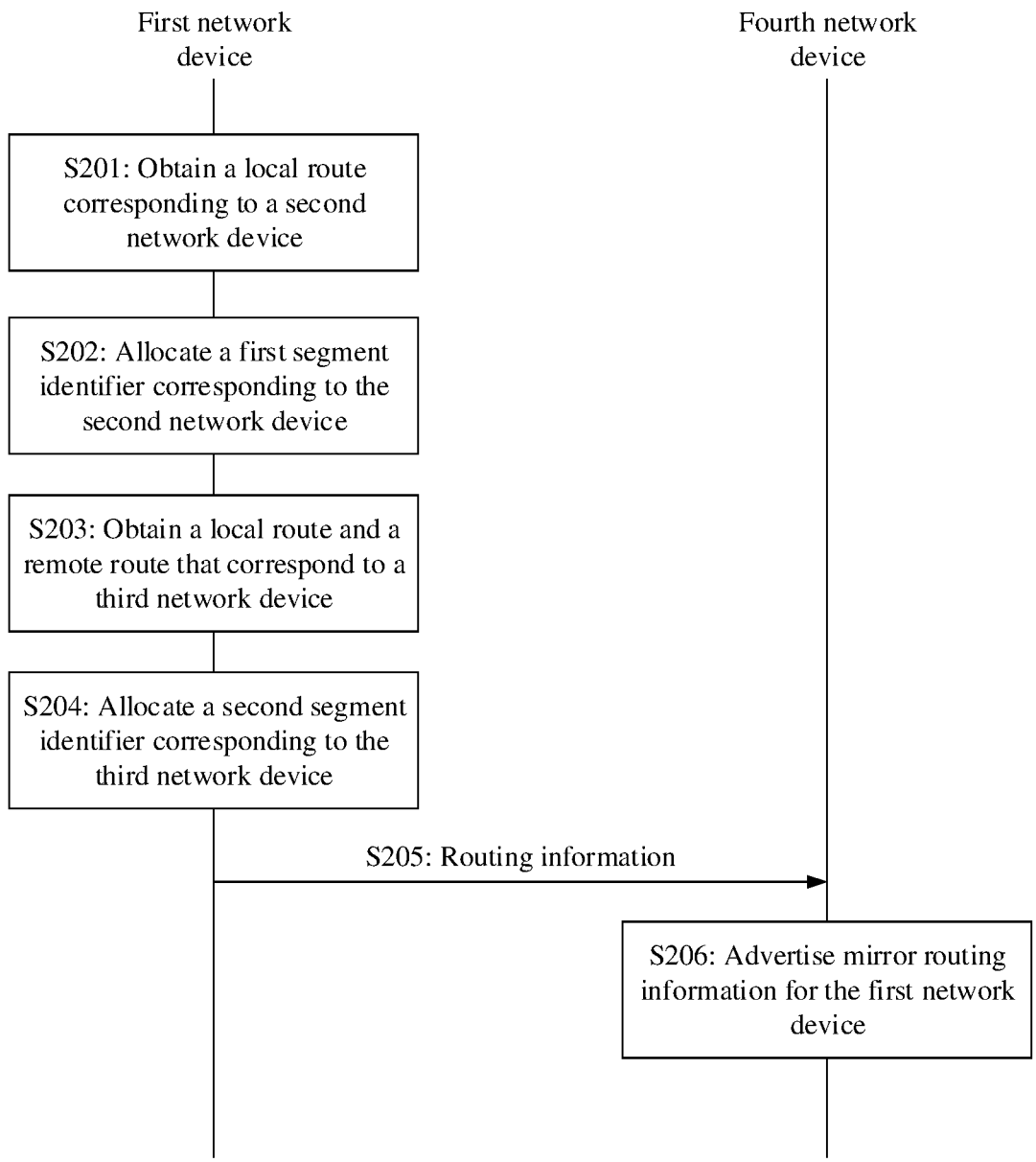
FIG. 2 is a schematic diagram of a routing information processing process according to an embodiment.

Similarly, for manners in which the first network device determines a single-homed/multi-homed state of each of the third network device and the fourth network device relative to the first network device in S302 and S303, refer to S202 and S204 in FIG. 2. Details are not described herein again.

S304: The first network device advertises mirror routing information for the second network device.

The first network device may determine, based on the second segment identifier, that the first network device and the second network device are multi-homing devices of the fourth network device. The first network device may determine that the fourth network device is a multi-homed network device and may determine that the fourth network device is multi-homed to the first network device and the second network device. The first network device may generate mirror protection for the second network device based on the second segment identifier.

In a possible implementation, the mirror routing information includes the second segment identifier, but does not include the first segment identifier, to generate the mirror protection for the first network device. For example, the first network device advertises the mirror information, and declares the mirror protection for the second network device based on the second segment identifier of the fourth network device. The mirror information advertised by the first network device carries the second segment identifier of the fourth network device, but does not carry the first segment identifier of the third network device.

In another possible implementation, the mirror routing information includes the second location identifier corresponding to the second segment identifier but does not include the first location identifier corresponding to the first segment identifier, to generate the mirror protection for the second network device. For example, the first network device advertises mirror information, and declares the mirror protection for the second network device based on the second location identifier corresponding to the second segment identifier of the fourth network device. The mirror information advertised by the first network device carries the second location identifier, but does not carry the first location identifier corresponding to the first segment identifier.

In this way, when a link between the second network device and the fifth network device fails, and/or the second network device fails, a packet destined for the fourth network device hits the mirror protection, and the first network device performs a mirror protection procedure. The first network device sends the received packet to the fourth network device, to ensure that the fourth network device can normally receive the packet. This avoids traffic interruption.

For a scenario in which a transmission link of a packet destined for the single-homed network device fails, for example, a scenario in which the link between the fifth network device and the second network device fails, if a destination network device of the packet is the third network device, because the first network device does not generate mirror protection for the third network device based on the first segment identifier, the first network device does not discard the packet but forwards the packet to the second network device when the fifth network device forwards the packet to the first network device. The second network device sends the packet to the third network device based on the first segment identifier. This avoids traffic interruption.

The packet may reach the fifth network device, and the fifth network device may sense that a link to the third network device fails. Consequently, the packet cannot be sent to the third network device through the link: the fifth network device—the second network device—the third network device. The fifth network device sends the packet to the first network device as a backup device, and the first network device sends the packet to the second network device. Because the second network device does not fail, the second network device sends the packet to the third network device, where the second network device is a single-homing device of the third network device.

For a scenario in which a transmission link of a packet destined for the multi-homed network device fails, for example, a scenario in which the link between the fifth network device and the second network device fails and/or the second network device fails, if a destination network device of the packet is the fourth network device, the fifth network device sends the packet to the first network device, and the first network device sends the packet to the fourth network device based on the second segment identifier.

The packet may reach the fifth network device, and the fifth network device may sense that a link that is to the fourth network device through the second network device fails. Consequently, the packet cannot be sent to the fourth network device through the link: the fifth network device—the second network device—the fourth network device. The fifth network device determines, based on the second segment identifier of the packet, that the first network device has generated the mirror protection for the second segment identifier. The fifth network device sends the packet to the first network device by performing mirror protection, where the first network device and the second network device are dual-homing devices of the fourth network device. After receiving the packet, the first network device sends the packet to the fourth network device.

Optionally, the first network device sends third routing information to the second network device, and the second network device determines a single-homed/multi-homed state of the second network device and/or the single-homed/multi-homed state of the third network device by using the third routing information as a remote route.

For example, the first network device sends the routing information corresponding to the fourth network device, where the routing information corresponding to the fourth network device includes the second identifier, the second identifier includes the second ESI or the second destination IP address, the second ESI identifies the fourth network device, and the second destination IP address points to the fourth network device. Still using an example in which the fourth network device is the multi-homed network device for description, the third routing information includes the second identifier corresponding to the fourth network device.

Based on FIG. 2 and FIG. 3, in an embodiment, an EVPN scenario is used as an example to describe a routing information processing process in detail. A routing information processing process in an L3VPN scenario is similar to that in the EVPN scenario, and similarities are not described again. Still using the network structure shown in FIG. 1 as an example, the routing information processing process is as follows:

A location identifier group locator-group group1 is configured in the PE 21, and a first location identifier locator loc1 100::64 static 32 single-home and a second location identifier locator loc2 200::64 static 64 multi-home are configured in the location identifier group, where the first location identifier is a location identifier corresponding to a single-homed network device, and the second location identifier is a location identifier corresponding to a multi-homed network device.

Figure 4:
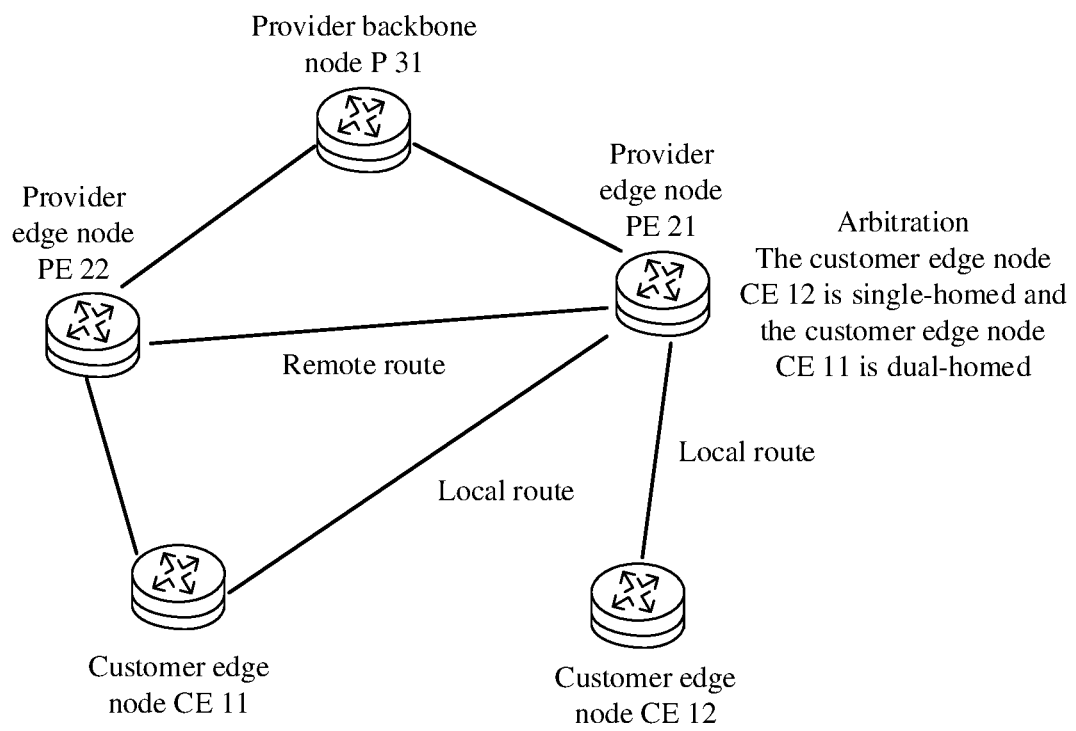
FIG. 4 is a schematic diagram of a network according to an embodiment.

Refer to FIG. 4. The PE 21 finds, based on an obtained local route and an obtained remote route, that a route corresponding to the CE 12 includes only one local route, and therefore arbitrates that the CE 12 is a single-homed network device. The PE 21 further finds that routes corresponding to the CE 11 include a local route and a remote route, and therefore arbitrates that the CE 11 is a dual-homed network device.

The EVPN scenario may support ESI deployment. The PE 21 configures different ESIs for accessing CEs. For example, the PE 21 allocates a first ESI to the CE 12 and allocates a second ESI to the CE 11. It should be noted that, in a possible implementation, for a single-homed CE, the PE may alternatively choose not to allocate an ESI to the CE but allocate different ESIs only to multi-homed CE devices. For example, the PE 21 allocates a corresponding ESI only to the CE 11, but not allocate an ESI to the CE 12.

The PE 21 obtains a local ES-AD route corresponding to the CE 12, where the local ES-AD route corresponding to the CE 12 includes the first ESI. The PE 21 determines that the first ESI exists only in the local ES-AD route corresponding to the CE 12 and arbitrates that the CE 12 is the single-homed network device, that is, an access side interface of the CE 12 is a single-homing access point and is connected only to the PE 21.

The PE 21 obtains a local ES-AD route corresponding to the CE 11, where the local ES-AD route corresponding to the CE 11 includes the second ESI. The PE 22 serves as a neighboring PE of the PE 21 and advertises a locally obtained ES-AD route corresponding to the CE 11 to the PE 21. The PE 21 learns a remote ES-AD route corresponding to the CE 11 from the PE 22. The remote ES-AD route corresponding to the CE 11 includes the second ESI. The PE 21 determines that the second ESI exists in the local ES-AD route and the remote ES-AD route that correspond to the CE 11 and arbitrates that the CE 11 is the dual-homed network device, that is, an access side interface of the CE 11 is a dual-homing access point and is separately connected to the PE 21 and the PE 22.

The L3VPN scenario does not support the ESI deployment. The PE 21 obtains a first destination IP address corresponding to the accessing CE 12 and obtains a second destination IP address corresponding to the CE 11. The PE 21 obtains a local route corresponding to the CE 12, where the local route corresponding to the CE 12 includes the first destination IP address. The PE 21 determines that the first destination IP address exists only in the local route and arbitrates that the CE 12 is the single-homed network device, that is, an access side interface of the CE 12 is a single-homing access point and is connected only to the PE 21.

The PE 21 obtains a local route corresponding to the CE 11, where the local route corresponding to the CE 11 includes the second destination IP address. The PE 22 serves as a neighboring PE of the PE 21 and advertises a learned route corresponding to the CE 11 to the PE 21. The PE 21 learns a remote route corresponding to the CE 11 from the PE 22. The remote route corresponding to the CE 11 includes the second destination IP address. The PE 21 determines that the second destination IP address exists in the local route and the remote route that correspond to the CE 11 and arbitrates that the CE 11 is the dual-homed network device, that is, an access side interface of the CE 11 is a dual-homing access point and is separately connected to the PE 21 and the PE 22.

Figure 5:
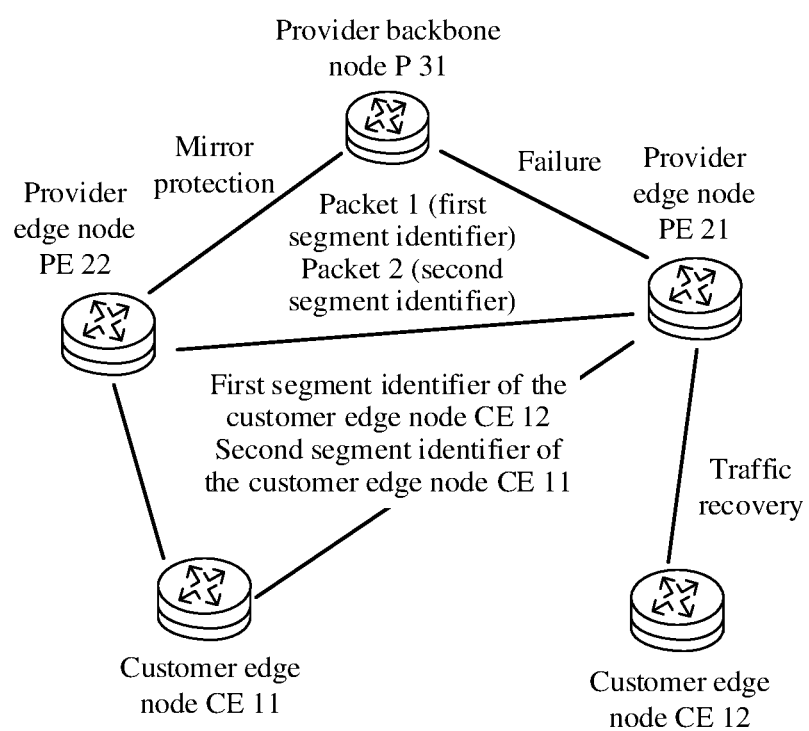
FIG. 5 is a schematic diagram of a network according to an embodiment.

Refer to FIG. 5 on a basis that the PE 21 determines that the CE 12 is the single-homed network device of the PE 21 and determines that the CE 11 is the dual-homed network device of the PE 21 in FIG. 4. The PE 21 allocates a corresponding first segment identifier to the CE 12 based on the first location identifier locator loc1 100:64 static 32 single-home. The PE 21 allocates a corresponding second segment identifier to the CE 11 based on the second location identifier locator loc2 200:64 static 64 multi-home. The first location identifier and the second location identifier belong to the same location identifier group. The PE 21 sends routing information, where the routing information includes the first segment identifier and the second segment identifier. The PE 22 receives the routing information and advertises mirror routing information for the PE 21 based on the second segment identifier, where the mirror routing information includes the second segment identifier but does not include the first segment identifier; or the mirror routing information includes the second location identifier corresponding to the second segment identifier but does not include the first location identifier corresponding to the first segment identifier. The P node 31 receives the mirror routing information advertised by the PE 21.

The P node 31 senses that a failure occurs, and sends, to the PE 22, a packet 1 to be sent to the CE 12, where the packet 1 carries the first segment identifier. The P node 31 sends, to the PE 22, a packet 2 to be sent to the CE 11, where the packet 2 carries the second segment identifier. The PE 22 receives the packet 1 and sends the packet 1 to the PE 21 based on the first segment identifier. If a link between the P node 31 and the PE 21 fails, but the PE 21 does not fail, the PE 21 sends the packet 1 to the CE 12. In this way, traffic can be normally sent for an egress failure in a single-homing scenario. The PE 22 receives the packet 2 and sends the packet 2 to the CE 11. In this way, according to the corresponding solutions in the embodiments, processing of single-homing traffic and multi-homing traffic can be isolated. According to some scenarios in which a network link or an egress node fails, on the one hand, normal sending of the single-homing traffic can be ensured; on the other hand, when a multi-homing egress node fails, fast PE switching can be completed through mirror protection, to ensure normal running of a service.

Figure 6:
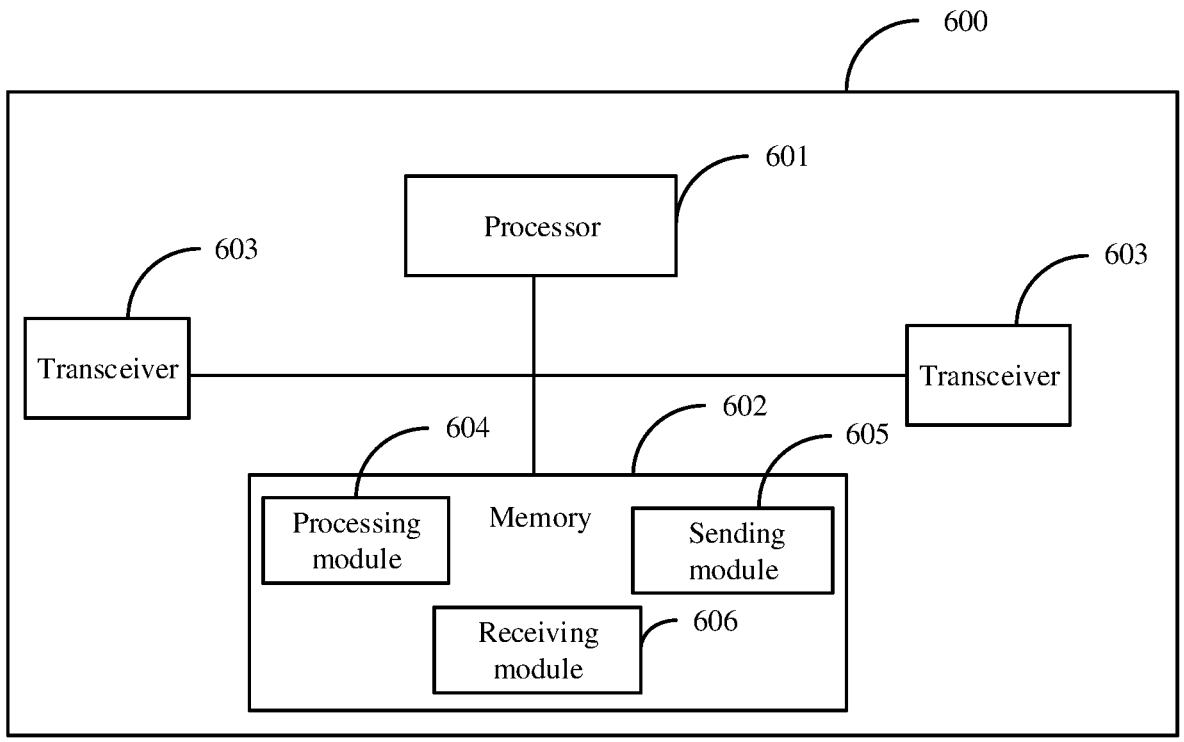
FIG. 6 is a schematic diagram of a structure of a network device according to an embodiment.

FIG. 6 is a schematic diagram of a network device 600. The network device 600 may be used in the network architecture shown in FIG. 1, for example, may be the PE 21 or the PE 22 in the network architecture shown in FIG. 1. The network device 600 is configured to perform an operation performed by the first network device in FIG. 2 or FIG. 3 or is configured to perform an operation performed by any corresponding PE device in FIG. 4 or FIG. 5.

As shown in FIG. 6, the network device 600 may include a processor 601 and a memory 602 and a transceiver 603 that are coupled to the processor 601. The processor 601 may be a central processing unit (CPU), a network processor (NP), or a combination of a CPU and an NP. The processor 601 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof. The processor 601 may be one processor or may include a plurality of processors. The memory 602 may include a volatile memory, for example, a random access memory (RAM); the memory may include a non-volatile memory, for example, a read-only memory (ROM), a flash memory, a hard disk drive (HDD), or a solid-state drive (SSD); or the memory 602 may include a combination of the foregoing types of memories. The memory 602 may be one memory or may include a plurality of memories. There may be one or more transceivers 603.

In this embodiment, the processor 601 performs a corresponding operation according to computer-readable instructions stored in the memory. For example, the transceiver 603 is configured to: obtain a local route corresponding to a second network device, where the local route includes a first identifier, the first identifier includes a first ESI or a first destination IP address, the first ESI identifies the second network device, and the first destination IP address points to the second network device; and obtain a local route and a remote route that correspond to a third network device, where each of the local route and the remote route includes a second identifier, the second identifier includes a second ESI or a second destination IP address, the second ESI identifies the third network device, and the second destination IP address points to the third network device. The processor 601 is configured to allocate, based on the fact that the first identifier exists only in the local route, a first segment identifier corresponding to the second network device, and allocate, based on the fact that the second identifier exists at least in the local route and the remote route, a second segment identifier corresponding to the third network device. The transceiver 603 is further configured to send routing information, where the routing information includes the first segment identifier and the second segment identifier. In addition, after executing the computer-readable instructions in the memory 602, the processor 601 may perform, as indicated by the computer-readable instructions, all operations that can be performed by the first network device.

In a possible implementation, the computer-readable instructions stored in the memory 602 may include a plurality of software modules, for example, a sending module 605, a processing module 604, and a receiving module 606. After executing each software module, the processor 601 may perform a corresponding operation as indicated by each software module.

Figure 7:
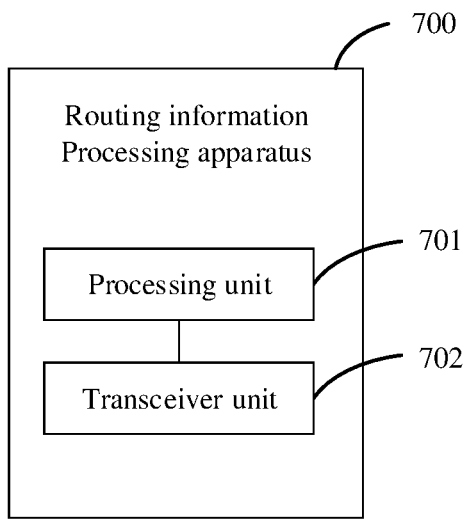
FIG. 7 is a schematic diagram of a structure of a route processing apparatus according to an embodiment.

FIG. 7 is a schematic block diagram of a routing information processing apparatus 700 according to an embodiment. The route determining apparatus may be the first network device in FIG. 2 or FIG. 3 (or a component having a function of the first network device, or the component may be coordinately used with the first network device to support the first network device to implement a corresponding function) or may be the PE 21 or the PE 22 in other examples. The route determining apparatus 700 may exist in a form of software or may be a chip that can be used in a device. The route determining apparatus 700 includes a processing unit 701 and a transceiver unit 702. Optionally, the transceiver unit 702 may be further divided into a sending unit (not shown in FIG. 7) and a receiving unit (not shown in FIG. 7). The sending unit is configured to support the route determining apparatus 700 to send information to another network element. The receiving unit is configured to support the route determining apparatus 700 to receive information from another network element.

If the route determining apparatus 700 is the first network device in FIG. 2 or FIG. 3, the processing unit 701 may be configured to support the first network device in FIG. 2 to perform S201, S202, S204, and the like, or support the first network device in FIG. 3 to perform S302, S303, S304, and the like, and/or may be used for other processes in the solutions, such as corresponding operations performed by the PE 21 or the PE 22. The transceiver unit 702 is configured to support communication between the first network device and another network element, for example, support the first network device in FIG. 2 to perform S205, or support the first network device in FIG. 3 to perform S301, and/or is configured to perform other sending and receiving operations in the solutions, such as corresponding sending and receiving operations performed by the PE 21 or the PE 22.

It should be noted that the foregoing division manner of the apparatus 700 is an example. Division into units may be logical function division. During implementation, there may be another division or combination manner, and different division or combination manners do not affect implementation of corresponding functions.

A person skilled in the art should understand that the embodiments may be provided as a method, a system, or a computer program product. Therefore, the embodiments may use a form of hardware-only embodiments, software-only embodiments, or embodiments with a combination of software and hardware. Moreover, the embodiments may use a form of a computer program product that is implemented on one or more computer-usable storage media (including but not limited to a disk memory, an optical memory, and the like) that include computer-usable program code.

The embodiments are described with reference to the flowcharts and/or block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a function in one or more processes in the flowcharts and/or in one or more blocks in the block diagrams.

These computer program instructions may alternatively be stored in a computer-readable memory that can indicate a computer or another programmable data processing device to work so that the instructions stored in the computer-readable memory generate an artifact that includes an instruction apparatus. The instruction apparatus implements a function in one or more processes in the flowcharts and/or in one or more blocks in the block diagrams.

It is clear that a person skilled in the art can make various modifications and variations without departing from the scope of the embodiments.

What is claimed is:

1. A routing information processing method, comprising:
obtaining, by a first network device, a local route corresponding to a second network device, wherein the local route comprises a first identifier, the first identifier comprises a first Ethernet segment identifier (ESI) or a first destination Internet protocol LIP address, the first ESI identifies the second network device, and the first destination IP address points to the second network device;
allocating, by the first network device based on the fact that the first identifier exists only in the local route, a first segment identifier corresponding to the second network device;
obtaining, by the first network device, a local route and a remote route that correspond to a third network device, wherein each of the local route and the remote route comprises a second identifier, the second identifier comprises a second ESI or a second destination IP address, the second ESI identifies the third network device, and the second destination IP address points to the third network device;
allocating, by the first network device based on the fact that the second identifier exists at least in the local route and the remote route, a second segment identifier corresponding to the third network device; and
sending, by the first network device, routing information, wherein the routing information comprises the first segment identifier and the second segment identifier.

2. The routing information processing method according to claim 1, wherein allocating, by the first network device based on the fact that the first identifier exists only in the local route, the first segment identifier corresponding to the second network device further comprises:
when ESI deployment is supported, allocating, by the first network device based on the fact that the first ESI exists only in the local route, the first segment identifier corresponding to the second network device, wherein the first identifier is the first ESI; or
when ESI deployment is not supported, allocating, by the first network device based on the fact that the first destination IP address exists only in the local route, the first segment identifier corresponding to the second network device, wherein the first identifier is the first destination IP address.

3. The routing information processing method according to claim 1, wherein allocating, by the first network device based on the fact that the second identifier exists at least in the local route and the remote route, the second segment identifier corresponding to the third network device further comprises:
when the ESI deployment is supported, allocating, by the first network device based on the fact that the second ESI exists at least in the local route and the remote route, the second segment identifier corresponding to the third network device, wherein the second identifier is the second ESI; or
when the ESI deployment is not supported, allocating, by the first network device based on the fact that the second destination IP address exists at least in the local route and the remote route, the second segment identifier corresponding to the third network device, wherein the second identifier is the second destination IP address.

4. The routing information processing method according to claim 1, wherein the remote route is received by the first network device from a fourth network device, and sending, by the first network device, the routing information further comprises:
sending, by the first network device, the routing information to the fourth network device.

5. The routing information processing method according to claim 1, wherein the first segment identifier corresponds to a first location identifier, the second segment identifier corresponds to a second location identifier, the first location identifier and the second location identifier belong to a same location identifier group, and the first location identifier is different from the second location identifier.

6. The routing information processing method according to claim 5, wherein the first location identifier and the second location identifier have different prefix lengths; or the first location identifier and the second location identifier have a same prefix length, but have different prefix content.

7. The routing information processing method according to claim 5, wherein the first network device stores a plurality of location identifier groups, the location identifier groups have different prefix lengths, and the location identifier group to which the first location identifier and the second location identifier belong belongs to the plurality of location identifier groups.

8. A routing information processing apparatus, comprising:
a processor and a memory, wherein the processor is coupled to the memory, wherein
the memory is configured to store a computer program; and
the processor is configured to execute the computer program stored in the memory, to enable the apparatus to:
obtain a local route corresponding to a second network device, wherein the local route comprises a first identifier, the first identifier comprises a first Ethernet segment identifier (ESI) or a first destination Internet protocol (IP) address, the first ESI identifies the second network device, and the first destination IP address points to the second network device; and
allocate, based on the fact that the first identifier exists only in the local route, a first segment identifier corresponding to the second network device, wherein
obtain a local route and a remote route that correspond to a third network device, wherein each of the local route and the remote route comprises a second identifier, the second identifier comprises a second ESI or a second destination IP address, the second ESI identifies the third network device, and the second destination IP address points to the third network device;
allocate, based on the fact that the second identifier exists at least in the local route and the remote route, a second segment identifier corresponding to the third network device; and
send routing information, wherein the routing information comprises the first segment identifier and the second segment identifier.

9. The routing information processing apparatus according to claim 8, wherein the processor is further configured to execute the computer program stored in the memory, to enable the apparatus to:
when ESI deployment is supported, allocate, based on the fact that the first ESI exists only in the local route, the first segment identifier corresponding to the second network device, wherein the first identifier is the first ESI; or
when ESI deployment is not supported, allocate, based on the fact that the first destination IP address exists only in the local route, the first segment identifier corresponding to the second network device, wherein the first identifier is the first destination IP address.

10. The routing information processing apparatus according to claim 8, wherein the processor is further configured to execute the computer program stored in the memory, to enable the apparatus to:
when the ESI deployment is supported, allocate, based on the fact that the second ESI exists at least in the local route and the remote route, the second segment identifier corresponding to the third network device, wherein the second identifier is the second ESI; or
when the ESI deployment is not supported, allocate, based on the fact that the second destination IP address exists at least in the local route and the remote route, the second segment identifier corresponding to the third network device, wherein the second identifier is the second destination IP address.

11. The routing information processing apparatus according to claim 8, wherein the processor is further configured to execute the computer program stored in the memory, to enable the apparatus to:
send the routing information to a fourth network device, wherein the remote route is received by a first network device from the fourth network device.

12. The routing information processing apparatus according to claim 11, wherein the first segment identifier corresponds to a first location identifier, the second segment identifier corresponds to a second location identifier, the first location identifier and the second location identifier belong to a same location identifier group, and the first location identifier is different from the second location identifier.

13. The routing information processing apparatus according to claim 12, wherein the first location identifier and the second location identifier have different prefix lengths; or the first location identifier and the second location identifier have a same prefix length, but have different prefix content.

14. The routing information processing apparatus according to claim 12, wherein the first network device stores a plurality of location identifier groups, the location identifier groups have different prefix lengths, and the location identifier group to which the first location identifier and the second location identifier belong belongs to the plurality of location identifier groups.

15. The routing information processing apparatus according to claim 8, wherein the processor is further configured to execute the computer program stored in the memory, to enable the apparatus to: receive a packet that is sent by a fifth network device and forwarded by the fourth network device, wherein a destination network device of the packet is the second network device, and a link between the first network device and the fifth network device fails; and
send the packet to the second network device based on the first segment identifier.

16. A routing information processing apparatus, comprising:
a processor and a memory, wherein the processor is coupled to the memory, wherein
the memory is configured to store a computer program; and
the processor is configured to execute the computer program stored in the memory, to enable the apparatus to:
receive routing information from a second network device, wherein the routing information comprises a first segment identifier corresponding to a third network device and a second segment identifier corresponding to a fourth network device;
obtain a first identifier and routing information corresponding to the third network device, wherein the first identifier exists only in a remote route corresponding to the third network device, and the first identifier comprises a first Ethernet segment identifier (ESI) or a first destination Internet protocol LIPS address;
obtain a second identifier and routing information corresponding to the fourth network device, wherein the second identifier exists in a local route and a remote route that correspond to the fourth network device, and the second identifier comprises a second ESI or a second destination IP address; and advertise mirror routing information for the second network device, wherein the mirror routing information comprises the second segment identifier, but does not comprise the first segment identifier; or the mirror routing information comprises a second location identifier corresponding to the second segment identifier, but does not comprise a first location identifier corresponding to the first segment identifier.

17. The routing information processing apparatus according to claim 16, wherein the second segment identifier corresponds to the second location identifier, and the processor is further configured to execute the computer program stored in the memory, to enable the apparatus to:

advertise, based on the second location identifier corresponding to the second segment identifier, the mirror routing information for the second network device, wherein the mirror routing information comprises the second location identifier, but does not comprise the first location identifier corresponding to the first segment identifier.

18. The routing information processing apparatus according to claim 16, wherein the processor is further configured to execute the computer program stored in the memory, to enable the apparatus to: before receiving the routing information from the second network device, send the routing information corresponding to the fourth network device, wherein the routing information comprises the second identifier, the second identifier comprises the second ESI or the second destination IP address, the second ESI identifies the fourth network device, and the second destination IP address points to the fourth network device.

19. The routing information processing apparatus according to claim 18, wherein when ESI deployment is supported, the second identifier comprises the second ESI; or when ESI deployment is not supported, the second identifier comprises the second destination IP address.

20. The routing information processing apparatus according to claim 16, wherein the processor is further configured to execute the computer program stored in the memory, to enable the apparatus to:

after advertising the mirror routing information for the second network device, receive a packet sent by a fifth network device, wherein a destination network device of the packet is the third network device, and a link between the second network device and the fifth network device fails; and send the packet to the second network device.

* * * * *